(12) United States Patent
Chan et al.

(10) Patent No.: US 7,002,819 B1
(45) Date of Patent: Feb. 21, 2006

(54) HALF-BRIDGE INVERTER

(75) Inventors: Chun-Kong Chan, Hsi Chih (TW); Jeng-Shong Wang, Hsin Chuang (TW)

(73) Assignee: Lien Chang Electronic Enterprise Co., Ltd., Taipei (TW)

( * ) Notice: Subject to any disclaimer, the term of this patent is extended or adjusted under 35 U.S.C. 154(b) by 0 days.

(21) Appl. No.: 11/068,790

(22) Filed: Mar. 2, 2005

(51) Int. Cl.
*H04M 7/5387* (2006.01)

(52) U.S. Cl. ..................................... 363/132
(58) Field of Classification Search ................. 363/95, 363/97, 131, 132; 315/306, 307, 308
See application file for complete search history.

(56) References Cited

U.S. PATENT DOCUMENTS

| | | | | |
|---|---|---|---|---|
| 3,978,390 A | * | 8/1976 | Remery | 363/131 |
| 4,156,273 A | * | 5/1979 | Sato | 363/21.16 |
| 4,745,537 A | * | 5/1988 | Cheung | 363/37 |
| 5,449,979 A | * | 9/1995 | Ueoka et al. | 315/225 |
| 5,563,777 A | * | 10/1996 | Miki et al. | 363/37 |
| 5,615,093 A | | 3/1997 | Nalbant | |

* cited by examiner

*Primary Examiner*—Adolf Berhane
(74) *Attorney, Agent, or Firm*—Rosenberg, Klein & Lee

(57) ABSTRACT

A half-bridge inverter achieves an inversion by switching an external-driven switch and a self-driven switch, and includes a transformer having a primary winding, a secondary winding and an auxiliary winding. The external-driven switch coupled to the first winding and ground is controlled by a square wave signal. The self-driven switch coupled to the primary winding, auxiliary winding and a DC power supply is controlled by an output voltage of the auxiliary winding. A resonant capacitor is coupled to the secondary winding. The square wave signal controls the switching of the external-driven switch, and the switching of the self-driven switch controlled by the output voltage of the auxiliary winding introduces DC power into the primary winding of the transformer while sensing an alternating voltage at the secondary winding of the transformer. A resonant capacitor filters harmonic waves into low-noise AC power to reduce interferences and supply power to a load.

7 Claims, 6 Drawing Sheets

HALF-BRIDGE INVERTER

BACKGROUND OF THE INVENTION

1. Field of the Invention

The present invention relates to a half-bridge inverter, and more particularly to a half-bridge inverter that accomplishes an inversion by switching an external-driven switch and a self-driven switch.

2. Description of Related Art

As electronic and computer devices are increasingly complicated, a power supply device becomes more important than ever. A power supply device can be divided into two main types: a linear type and a switching type. Since the linear type is less advantageous than the switching type, therefore, most power supply devices are the switching type.

The power supply for a backlight source of a thin film transistor (TFT) panel mainly uses a DC-AC inverter circuit to achieve the power conversion and drive a cold cathode fluorescent lamp (CCFL) to illuminate. With a different circuit topology, a conventional prior type of inverter circuit is generally divided into a half-bridge inverter circuit, a full-bridge inverter circuit, and a push-pull inverter circuit, which are inverter circuits for converting direct current (DC) into alternate circuit (AC).

U.S. Pat. No. 5,615,093 discloses a half-bridge inverter circuit. Referring to FIG. 1, a schematic circuit diagram of a half-bridge inverter circuit driving a load is illustrated. In FIG. 1, a transformer T1 divides a circuit into a primary circuit and a secondary circuit, and a feedback network 30 is connected between these two circuits. The primary circuit comprises a direct current power supply VDD, two electronic switches Q1, Q2, a half-bridge control chip 10 and a LCC resonant network 40, and the secondary circuit comprises a lamp load 20. With reference to FIG. 2 together with FIG. 1, schematic views of the output control signal of a half-bridge control chip and the voltage waveform of an alternate current (AC) according to a prior art are illustrated. The half-bridge control chip 10 uses two output ends LFET1, LFET2 to output control signals D1, D2, and the control signals D1, D2 respectively control the switching of two electronic switches Q1, Q2. By switching the two electronic switches Q1, Q2, the electric power of the direct current (DC) power supply is supplied to the primary winding of the transformer T1 through the LCC resonant network 40 to define an AC power supply ac. The AC power supply ac is provided for supplying power to the transformer T1, and the transformer T1 steps up and converts the AC power to the secondary winding for driving the lamp load 20.

In the foregoing description, the half-bridge inverter circuit disclosed in the U.S. Pat. No. 5,61.5,093 requires a half-bridge control chip 10 having at least two outputs to drive directly the electronic switches Q1, Q2 and control the alternating connection of the switches Q1, Q2. Further, the half-bridge control chip 10 also needs to control the first switch Q1 and the second switch Q2 to alternate for a short time by turning the switches on and off alternatingly. Therefore, it is necessary to have a little dead time for the control signals D1, D2 as shown in FIG. 2 to avoid a concurrent electric connection of the first switch Q1 and the second switch Q2, which will destroy both the first switch Q1 and the second switch Q2.

Further, the control signals D1, D2 need to change the signal cycle and control the switching of the first switch Q1 and the second switch Q2 to supply the electric power for the load according to the power requirement of the lamp load 20. The half-bridge control chip 10 needs to protect the circuit according to the conditions fed back from the load end, such as the condition of a too-low voltage output, a too-high voltage output, an open circuit of the lamp or overheat etc. The output of the control signal D1, D2 is terminated to switch off the first switch Q1 and the second switch Q2 to achieve a circuit protection function.

As described above, the conventional prior half-bridge inverter circuit comes with a half-bridge control chip 10 having two drive signals for driving the half-bridge circuit. Meanwhile, a protect circuit is needed to protect the secondary circuit of the transformer. Such requirement causes a high cost and an excessively large size of the product.

SUMMARY OF THE INVENTION

Therefore, it is a primary objective of the present invention to provide a half-bridge inverter that achieves an inversion by using any PWM integrated circuit and switching an external-driven switch and a self-driven switch. The external-driven switch is controlled by a square wave signal and works together with the self-driven switch for converting a DC power supply into an alternate current power and supplying the power for at least one lamp.

The present invention comprises a transformer having a primary winding, a second winding and an auxiliary winding. The transformer is coupled to the external-driven switch. The external-driven switch is coupled to the primary winding of the transformer and ground and controlled by the square wave signal. The self-driven switch is coupled to the primary winding, the auxiliary winding and the direct current power supply of the transformer and controlled by an output voltage of the auxiliary winding. A resonant capacitor is coupled to the secondary winding. Therefore, the present invention uses the square wave signal to control the switching of the external-driven switch and the output voltage of the auxiliary winding to control the switching of the self-driven switch. By alternately switching the switches, a direct current power supply is introduced to the primary winding of the transformer while sensing an alternating voltage at the second winding of the transformer. The alternating voltage is converted into alternating current power through the resonant capacitor. Further, the external-driven switch of the invention includes a first polar capacitor (or an additional capacitor) and a first interface diode (or an additional diode) between two output gates in the external-driven switch. The self-driven switch of the invention includes a second polar capacitor (or an additional capacitor) and a second interface diode (or an additional diode) between two output gates in the self-driven switch. Therefore, the square wave signal and the output voltage of the auxiliary winding respectively control the switching of the external-driven switch and the self-driven switch to charge or discharge the polar capacitor (or an additional capacitor) and the second polar capacitor (or an additional capacitor) by the DC power supply. The charging/discharging power is supplied to the primary winding of the transformer while sensing an alternating voltage at the secondary winding of the transformer and converted into the AC power by the resonant capacitor.

BRIEF DESCRIPTION OF THE DRAWINGS

The foregoing aspects and many of the attendant advantages of this invention will be more readily appreciated as the same becomes better understood by reference to the following detailed description, when taken in conjunction with the accompanying drawings, wherein.

DETAILED DESCRIPTION OF THE PREFERRED EMBODIMENTS

Figure 1:
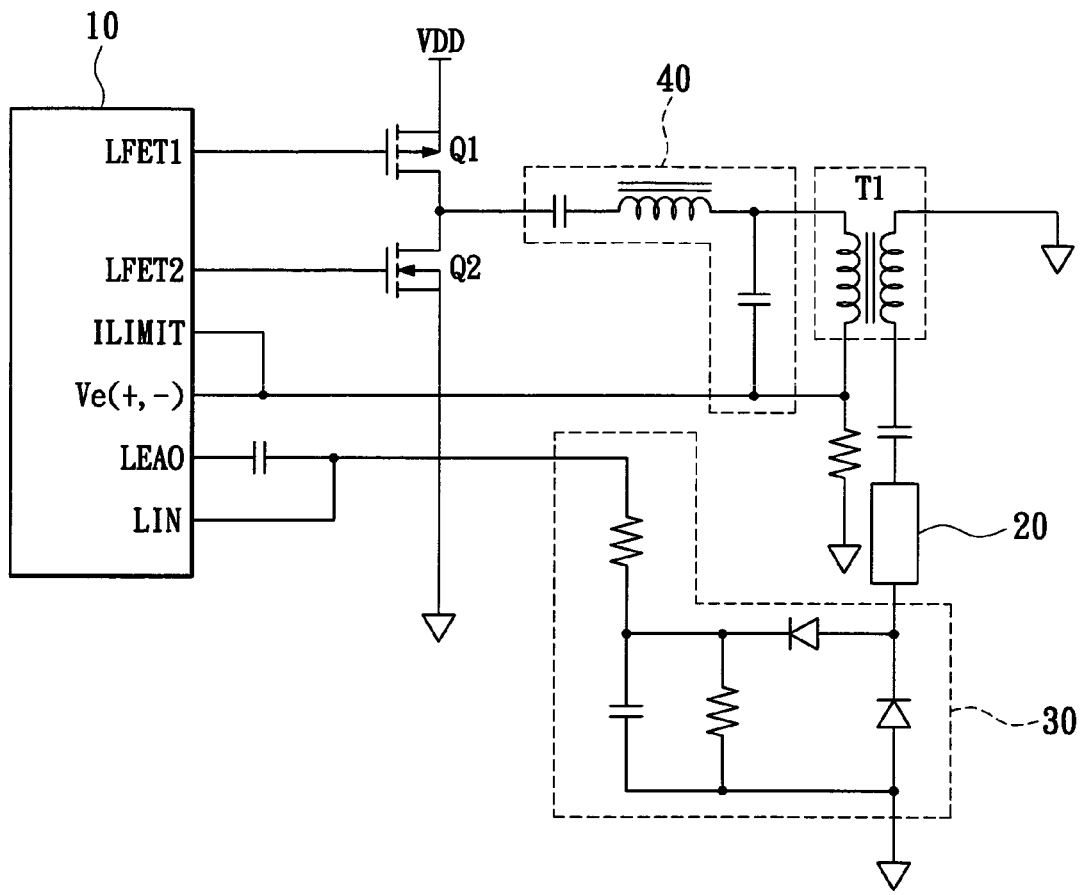
FIG. 1 is a schematic circuit diagram of a half-bridge inverter circuit driving a load according to the prior art.
Figure 2:
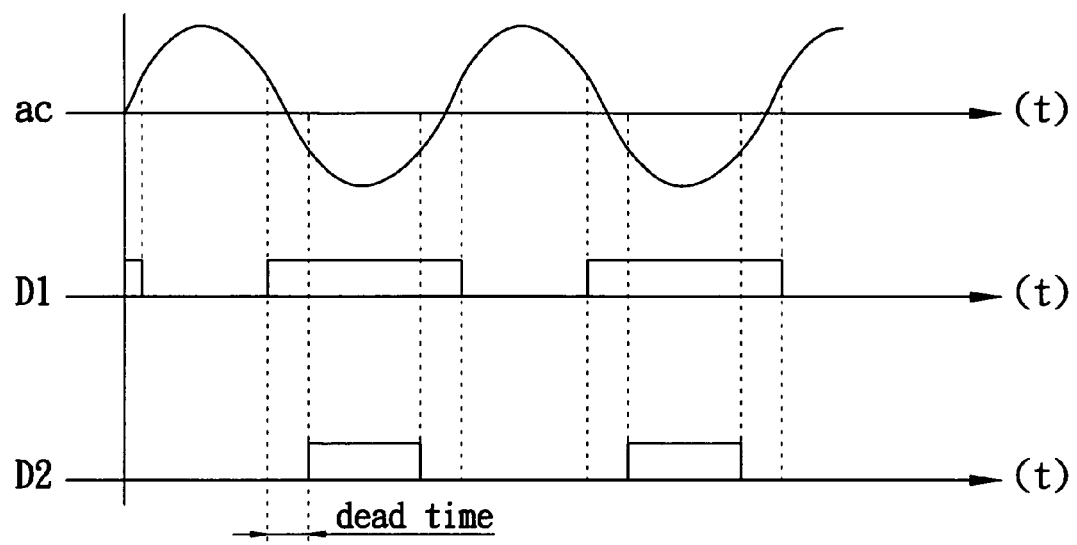
FIG. 2 is a schematic diagram of an output control signal of a half-bridge control chip and a voltage waveform of an alternate current power supply according to the prior art.
Figure 3:
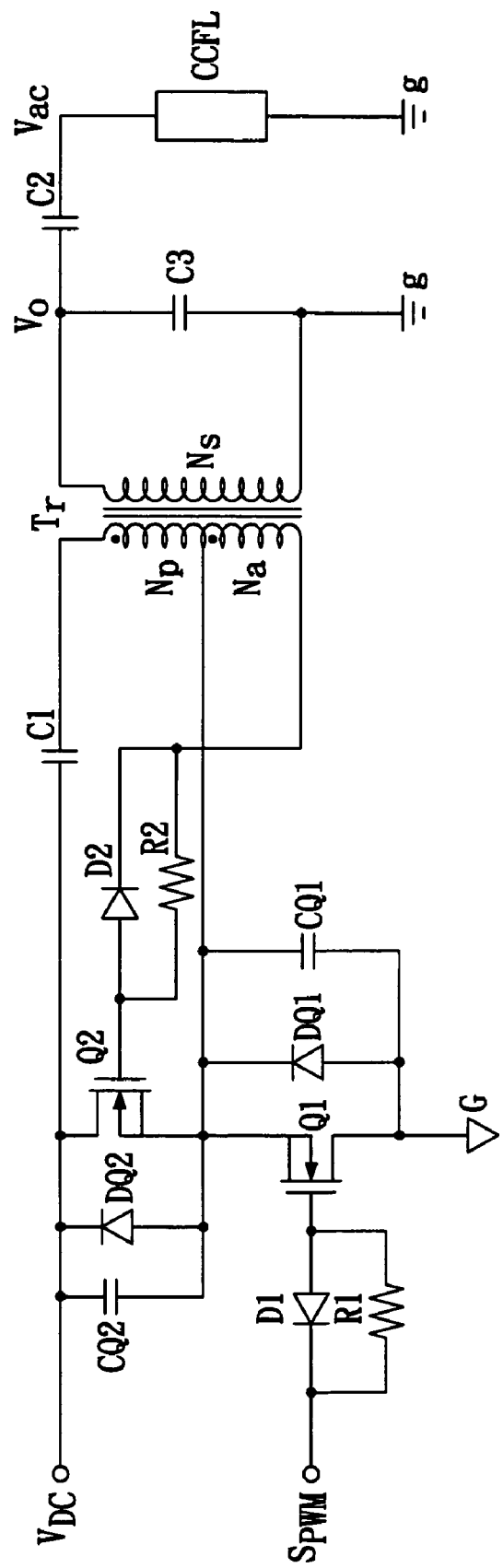
FIG. 3 is a schematic circuit diagram of a half-bridge inverter circuit driving a load according to the present invention.
Figure 4A:
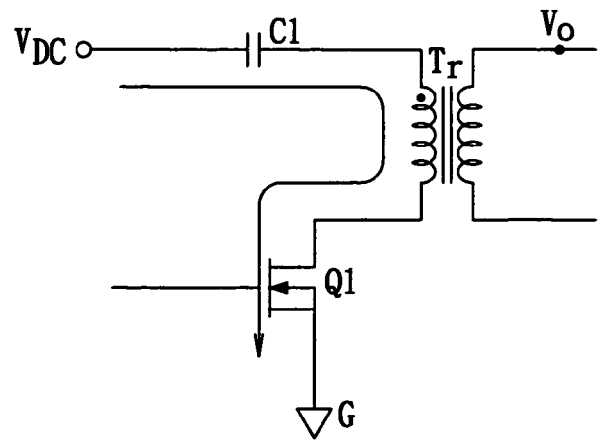
FIGS. 4A to 4F are schematic diagrams illustrating the actions taken in a cycle of a circuit according to the present invention.
Figure 4B:
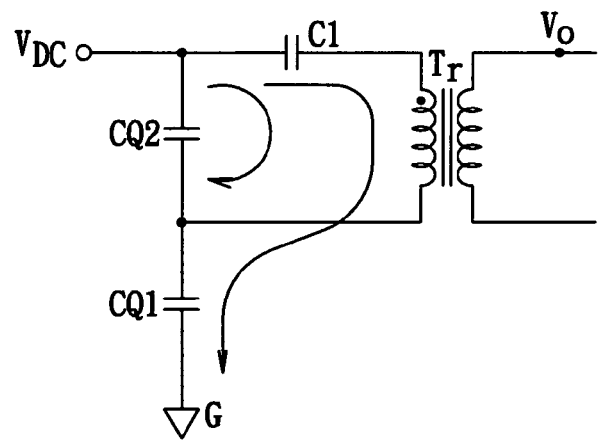
Figure 4C:
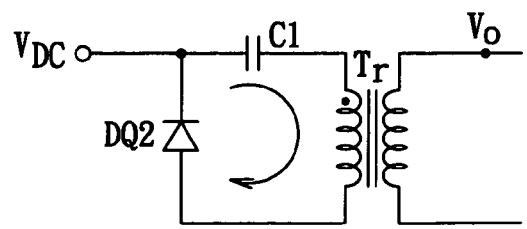
Figure 4D:
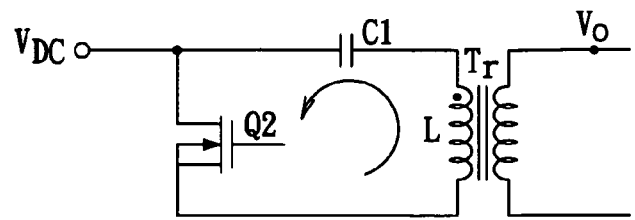
Figure 4E:
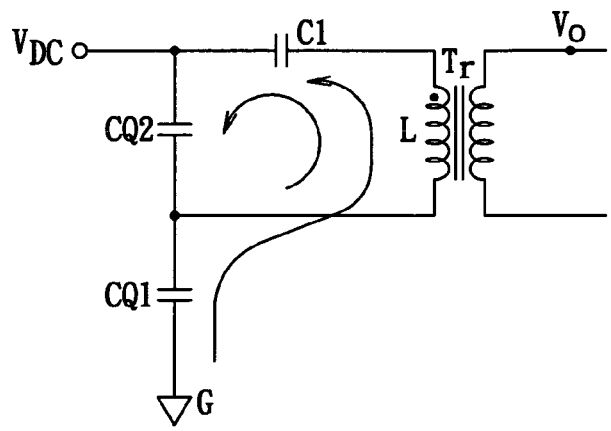
Figure 4F:
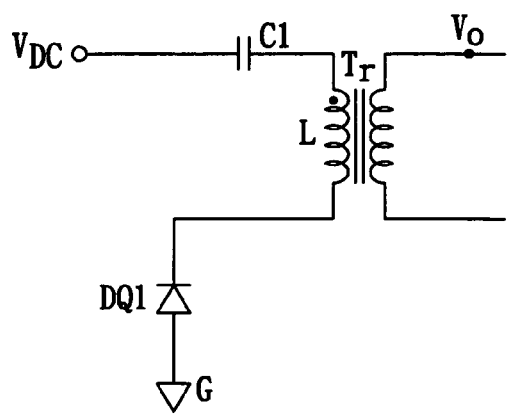

Reference to FIG. 3 is made for a schematic circuit diagram of a half-bridge inverter in accordance with the present invention. A half-bridge inverter of the invention is controlled by a square signal $S_{PWM}$ for converting DC power supply VDC into AC power supplied for the use of at least one cold cathode fluorescent lamp (CCFL). The half-bridge inverter comprises a primary winding Np, a secondary winding Ns and an auxiliary winding Na of a transformer Tr. An external-driven switch Q1 is coupled to the primary winding Np and ground G and controlled by the square wave signal $S_{PWM}$. A self-driven switch Q2 is coupled to the primary winding Np, the auxiliary winding Na and the direct current power supply VDC and controlled by an output voltage of the auxiliary winding Na. A resonant capacitor is coupled to the secondary winding Ns.

With the switching of the external-driven switch Q1 controlled by the square wave signal $S_{PWM}$ and the switching of the self-driven switch Q2 controlled by the output voltage of the auxiliary winding Na, the DC power supply VDC is introduced to the primary winding Np of the transformer Tr while an alternating voltage is sensed at the secondary winding Ns of the transformer Tr, and then converted into the AC power by the resonant capacitor C3.

Referring to FIG. 3 again, the present invention further comprises a fast diode D1 coupled to a control end of the external-driven switch Q1 for suppressing the current passing through the control end when the external-driven switch Q1 is electrically connected and accelerating to turn off the external-driven switch Q1 while the external-driven switch Q1 is being turned off. A second accelerated diode D2 is coupled to a control end of the self-driven switch Q2 and the auxiliary winding Na for suppressing the current passing through the control end when the self-driven switch Q2 is electrically connected and accelerating to turn off the self-driven switch Q2 while the self-driven switch Q2 is being turned off. In the foregoing description, the external-driven switch Q1 is an N-channel field effect transistor (FET) having a first polar capacitor CQ1 (or an additional capacitor) and a first interface diode (or an additional diode) disposed between two output gates of the external-driven switch. Further, the self-driven switch Q2 is an N-channel field effect transistor (FET) having a second polar capacitor CQ2 (or an additional capacitor) and a second interface diode (or an additional diode) disposed between two output gates of the self-driven switch.

Figure 5:
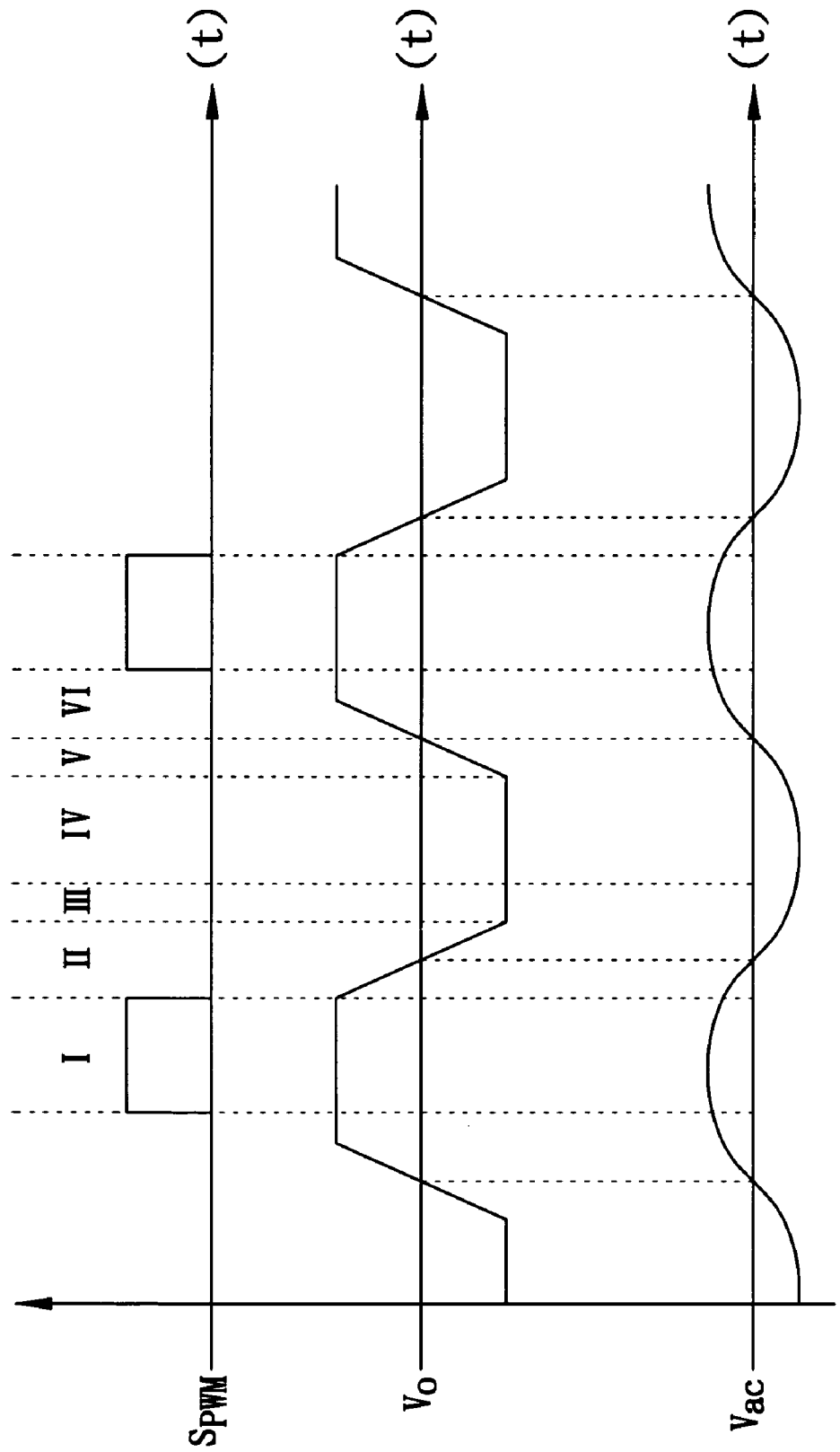
FIG. 5 is a schematic diagram of a waveform in a cycle of a circuit according to the present invention.

Reference is made to FIGS. 4A to 4F for schematic views of the actions taken in a cycle of a circuit in accordance with the present invention, while referring to FIG. 5 simultaneously for a schematic diagram of the waveform in a cycle of a circuit of the invention. During period I, the square wave signal $S_{PWM}$ is high, and the external-driven switch Q1 at that time is turned ON by the control of the square wave signal $S_{PWM}$ and the self-driven switch Q2 is turned OFF. Therefore, the DC power supply VDC provides a path through the capacitor C1 and transformer Tr to the external-driven switch Q1, the current is stored in the transformer Tr, and a positive alternating voltage Vo is sensed by the secondary winding Ns of the transformer Tr.

During period II, the square wave signal $S_{PWM}$ is turned OFF by the control of the external-driven switch Q1, and the self-driven switch Q2 remains OFF. By that time, the electric power temporarily stored in the second polar capacitor CQ2 or additional capacitor of the self-driven switch Q2 will be discharged, and the current stored in the transformer Tr will charge the first polar capacitor CQ1 or additional capacitor in the external-driven switch Q1. Thus, the alternating voltage Vo of the secondary winding Ns of the transformer Tr is at a low voltage.

During period III, both of the external-driven switch Q1 and the self-driven switch still remain OFF. When the first polar capacitor CQ1 or the additional capacitor is charged up to the voltage of the DC power supply VDC, and the second polar capacitor CQ2 or additional capacitor is discharged to zero voltage, the second interface diode DQ2 or additional diode is turned ON and the self-driven switch Q2 is switched to zero voltage. Therefore, the alternating voltage sensed by the secondary winding Ns of the transformer Tr is at a negative alternating voltage Vo status.

During period IV, the self-driven switch Q2 is turned ON by the control of the auxiliary winding Na of the transformer Tr. By that time, the direction of the current passing through the primary winding Np of the transformer Tr is reversed, and the energy will be accumulated in the transformer Tr. In this period, the alternating voltage sensed by the secondary winding Ns of the transformer Tr is at a negative alternating voltage status.

During period V, the self-driven Q2 is switched OFF, and the external-driven switch Q1 still remains OFF. By that time, the first polar capacitor CQ1 or additional capacitor in the external-driven switch Q1 discharges the temporarily stored electric power, and the current stored in the transformer will charge the second polar capacitor CQ2 or additional capacitor in the self-driven switch Q2. Therefore, the alternating voltage Vo sensed by the secondary winding Ns of the transformer Tr is at a rising voltage status.

During period VI, if the second polar capacitor CQ2 or additional capacitor is charged up to the voltage of the DC power supply VDC and the first polar capacitor CQ1 or additional capacitor is discharged to zero voltage, then the first interface diode DQ1 or additional diode will be turned ON. By that time, the external-driven switch Q1 is switched to zero voltage. Therefore, the alternating voltage sensed by the secondary winding Ns of the transformer Tr is at a positive alternating voltage Vo status.

In the description above, the operation of the circuit returns to Period I after Period VI is finished to complete a cycle. The waveform of the alternating voltage Vo output in the cycle of the circuit is converted into the AC power Vac by the resonant capacitor C3. Therefore, the present invention can achieve an inversion according to the cycle of the foregoing circuit. Furthermore, the present invention only needs a square signal to drive the half-bridge circuit. If a short circuit or any other failure occurs at the secondary winding of the transformer, the self-driven switch Q2 cannot continue its operation. The present invention does not require an additional peripheral circuit to achieve the circuit protection, and thus can reduce the manufacturing cost and the size of the product.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A half-bridge inverter, controlled by a square wave for converting a direct current power supply into an alternate current power for the use of at least one lamp, comprising:
    a transformer, having a primary winding, a secondary winding and an auxiliary winding;
    an external-driven switch, being coupled to said primary winding and ground and controlled by said square control signal;
    a self-driven switch, being coupled to said primary winding, said auxiliary winding and said direct current power supply and controlled by an output voltage of said auxiliary winding; and
    a resonant capacitor, being coupled to said secondary winding;
    wherein said square signal controls a switching of said external-driven switch and said output voltage of said auxiliary winding controls a switching of said self-driven switch introducing said direct current power supply into said primary winding of said transformer, while an alternating voltage is sensed by said secondary winding of said transformers senses and converted into alternate current power by said resonant capacitor.

2. The half-bridge inverter of claim 1, further comprising a first fast diode coupled to a control end of said external-driven switch for suppressing the current at said control end to pass through when said external-driven switch is electrically connected, and accelerating to turn off said external-switch when said external switch is being turned off.

3. The half-bridge inverter of claim 1, further comprising a second accelerated diode coupled to said control end of said self-driven switch and said auxiliary winding for suppressing the current at said control end to pass through when said self-driven switch is electrically connected, and accelerating to turn off said self-switch when said self switch is being turned off.

4. The half-bridge inverter of claim 1, wherein said external-driven switch is an N-channel field effect transistor and includes a first polar capacitor and a first interface diode disposed between two output gates in said external-driven switch.

5. The half-bridge inverter of claim 1, wherein said external-driven switch is an N-channel field effect transistor and includes a capacitor and a diode disposed between two output gates in said external-driven switch.

6. The half-bridge inverter of claim 1, wherein said self-driven switch is an N-channel field effect transistor and includes a second polar capacitor and a second interface diode disposed between two output gates in said self-driven switch.

7. The half-bridge inverter of claim 1, wherein said self-driven switch is an N-channel field effect transistor and includes a capacitor and a diode disposed between two output gates in said self-driven switch.

* * * * *